US012204566B2

(12) United States Patent
Wang et al.

(10) Patent No.: US 12,204,566 B2
(45) Date of Patent: Jan. 21, 2025

(54) AGGREGATING MAPPING TILE DATA

(71) Applicant: Deere & Company, Moline, IL (US)

(72) Inventors: Nanzhu Wang, Kirkland, WA (US); Hong Wu, Los Altos, CA (US); Jie Gu, Campbell, CA (US)

(73) Assignee: Deere &Company, Moline, IL (US)

( * ) Notice: Subject to any disclaimer, the term of this patent is extended or adjusted under 35 U.S.C. 154(b) by 0 days.

(21) Appl. No.: 17/954,551

(22) Filed: Sep. 28, 2022

(65) Prior Publication Data
US 2024/0104122 A1    Mar. 28, 2024

(51) Int. Cl.
*G06F 16/00*    (2019.01)
*G06F 16/29*    (2019.01)
*G06Q 50/02*    (2012.01)
*G06V 20/10*    (2022.01)

(52) U.S. Cl.
CPC ............. *G06F 16/29* (2019.01); *G06Q 50/02* (2013.01); *G06V 20/188* (2022.01)

(58) Field of Classification Search
None
See application file for complete search history.

(56) References Cited

U.S. PATENT DOCUMENTS

| | | | |
|---|---|---|---|
| 8,600,619 B2 | 12/2013 | Bales et al. | |
| 9,201,898 B2 | 12/2015 | Chawathe et al. | |
| 10,444,941 B2 | 10/2019 | Cervelli et al. | |
| 10,628,975 B2 | 4/2020 | Liu et al. | |
| 11,741,559 B1* | 8/2023 | Cragun | G06Q 30/0613 705/313 |
| 2013/0080504 A1* | 3/2013 | Maurer | G09B 29/006 709/203 |
| 2019/0286635 A1* | 9/2019 | Yu | G06F 16/9537 |
| 2020/0005902 A1 | 1/2020 | Mellen et al. | |
| 2020/0019777 A1* | 1/2020 | Gurzoni, Jr. | G06V 10/803 |
| 2020/0293505 A1* | 9/2020 | Ozakdag | G06F 16/26 |

OTHER PUBLICATIONS

European Patent Office; International Search Report and Written Opinion issued in Application No. PCT/US2023/032709;13 pages; dated Dec. 8, 2023.

* cited by examiner

*Primary Examiner* — Martin Mushambo
(74) *Attorney, Agent, or Firm* — Hanley, Flight & Zimmerman, LLC

(57) ABSTRACT

Implementations relate to updating agricultural records that include inferences gathered by one or more sensors deployed at an agricultural location. The records are matched to mapping tiles of a mapping application and the mapping tile records are updated according to the updated data that was received. Implementations further include identifying parent tiles to each of the updated records, where a parent tile is an aggregation of multiple mapping tiles that can be utilized by a mapping application to render an interface that allows a user to view the data with varying degrees of granularity.

20 Claims, 8 Drawing Sheets

| A | B | C | D |
|---|---|---|---|
| E | F | G | H |
| I | J | K | L |
| M | N | O | P |

| A+B+E+F | C+D+G+H |
|---|---|
| I+J+M+N | K+L+O+P |

AGGREGATING MAPPING TILE DATA

BACKGROUND

Large amount of data can be generated from sensor data captured by mobile sensors deployed in agricultural environments. For example, vehicles can be equipped with cameras that capture images while the vehicles traverse agricultural environments. The images can later be analyzed to determine multiple characteristics and/or predictions of the geographic locations where the images were captured. This can include, for example, crop yields, crop conditions, and/or other data that can later be analyzed without requiring an analyst to be present in the environmental location, such as via a mapping application that allows a user to view images, data derived from images, and/or other data captured by sensors (other than cameras) that were previously deployed in the agricultural location.

As the volume of data increases, mapping applications often need to aggregate data in order to present the data to a user. For example, a user may have interest in a larger area than what was surveyed for data. In those instances, the user may have more interest in being provided with aggregated data that generalizes one or more characteristics of an area, such as average crop yield, average moisture levels, and/or other characteristics for a larger area than what was captured in a single image and/or by a single sensor reading.

SUMMARY

Some implementations disclosed herein relate to updating zoomable map data with new data that is captured at a geographic location. In some instances, one or more agricultural vehicles equipped with sensors can traverse a geographic location such as a crop field and capture images and/or other sensor data (e.g., pH, temperature, moisture) that is present at the location. Other images may be captured from airborne vehicles such as unmanned aerial vehicles (UAVs) or satellites. From the images, other data can be generated that may be of interest to a user, such as leaf count and/or crop yield that is present in each image. The data can be utilized to generate one or more digital maps whereby a user can select a level of granularity to view the data. For example, in some instances, the user may have interest in viewing the data at a high granularity such as a resolution at which the data was captured, for example, a square meter. However, in some instances, the user may have interest in viewing the data with less granularity, such as, for example, a square kilometer.

A mapping application can allow a user to zoom in for finer granularity and zoom out for less granularity. In instances where the user is viewing the data at a lower granularity, the user can instead be provided with a view that is an aggregate (e.g., combination and/or average) of data views at a higher granularity. For example, a user may view mapped data at a first level of granularity and each data point that is provided, at that first level of granularity, can be an average of four data points from a second level granularity that is greater than the first level of granularity. Thus, as a user zooms out to view a geographic area with less granularity, each data point is generated based on more and more data that was captured at the geographic area.

In the present disclosure, a "data point" may correspond to an inference (e.g., an agricultural and/or phenotypic inference) or agricultural statistic associated with a "tile." A "tile" may represent (e.g., overlay) a geographic area or unit of, for instance, a crop field. Each tile may be associated with one or more data points (e.g., inferences or statistics) that are generated (e.g., using machine learning) based on sensor data gathered within the geographic area represented by the tile. As a non-limiting example, at a highest level of granularity, a mapping application configured with selected aspects of the present disclosure may logically segment a crop field into tiles. Each tile may correspond to, for instance, one square meter. Sensor data (e.g., images) captured within a given tile's underlying area may be processed, e.g., using one or more machine learning models, to generate one or more inferences. These inferences may include, for instance, fruit count within that one square meter, estimated crop yield for that one square meter, etc.

Continuing the above discussion pertaining to zooming, tiles at the lowest zoom level (and thus, highest level of granularity) may include data point(s) generated directly based on sensor data gathered in the underlying geographic areas. As the user zooms the mapping application out, data point(s) associated with each tile at the lower zoom level may be aggregated to create new data points for an aggregate tile at the lower granularity/higher zoom level. Similarly, some number of tiles may be combined into a single tile. For instance, a two-by-two matrix of tiles at the highest level of granularity (and lowest zoom) may be aggregated into a single tile, and the data points (e.g., inferences, statistics) generated for the tiles of the matrix may also be aggregated (e.g., averaged) to generate aggregate data points for the new single tile.

As new data is captured (e.g., by sensors mounted to/integral with agricultural vehicles or by sensors carried by/integral with airborne vehicles) to update the mapping application (and in particular, to update tiles of the mapping application), the new data can be queued in a work queue such that the data can be processed and replace old data that currently exists in the mapping application, thereby replacing a tile in the mapping application with a new tile with updated data. Each new record can be received with a geographic location indicating where the data was captured as well as a timestamp indicating when the data was received. The data can be processed in timestamp order, with each new tile replacing an already existing tile. In instances where a geographic location has been traversed multiple times, the data with the most recent timestamp can be selected to replace the current data, with duplicates removed from the processing queue.

In addition to replacing existing tile data with new tile data in the mapping application, one or more other levels of the mapping application may require updating to reflect the new data at a higher level of granularity. For example, for a highest level of granularity (e.g., inference(s) drawn for one square meter of a field), the captured data can be rendered to the user, e.g., as a tile with annotations. However, at the next lower level of granularity, the user can be provided with a new tile that is annotated with an average of, for example, four data points from the next higher level of granularity. Therefore, when data is updated in the mapping application, the parent tile (i.e., next lower level of granularity) may require updating. Further, the next layer of tiles above (i.e., "grandparents") may require updating. This may continue through multiple levels of tiles before each data point, entered in the highest level of granularity, propagates through all levels of tiles.

However, when, for example, four data points associated with four adjacent tiles are all updated (e.g., four tiles with the same parent tile), updating each of the data points can result in four requests to update the same parent tile. Each of these results can result in the same operation, which, without identifying the duplicate requests, can result in the same operation being performed four times. To avoid duplicating operations, the requests to update parent tiles can be clustered by parent tiles such that, for each identified cluster, only one of the operations is performed. For example, tiles A, B, C, and D can all have Parent tile P as the parent in the next level of a mapping application. If data points of A, B, C, and D are all updated based on a new data collection at the corresponding geographic locations, each of the updates can result in a separate request to update Parent tile P. Instead of processing each of the requests, the requests can be reviewed and clustered such that the four requests (e.g., from tiles A, B, C, and D) form a cluster. As a result, one of the update requests can be processed (e.g., the request from A) and the remaining duplicate requests do not require processing.

The above description is provided as an overview of some implementations of the present disclosure. Further description of those implementations, and other implementations, are described in more detail below.

BRIEF DESCRIPTION OF THE DRAWINGS

FIG. 3 is an illustration of mapping tiles at various levels of zoom, according to implementations disclosed herein.

DETAILED DESCRIPTION

Figure 1:
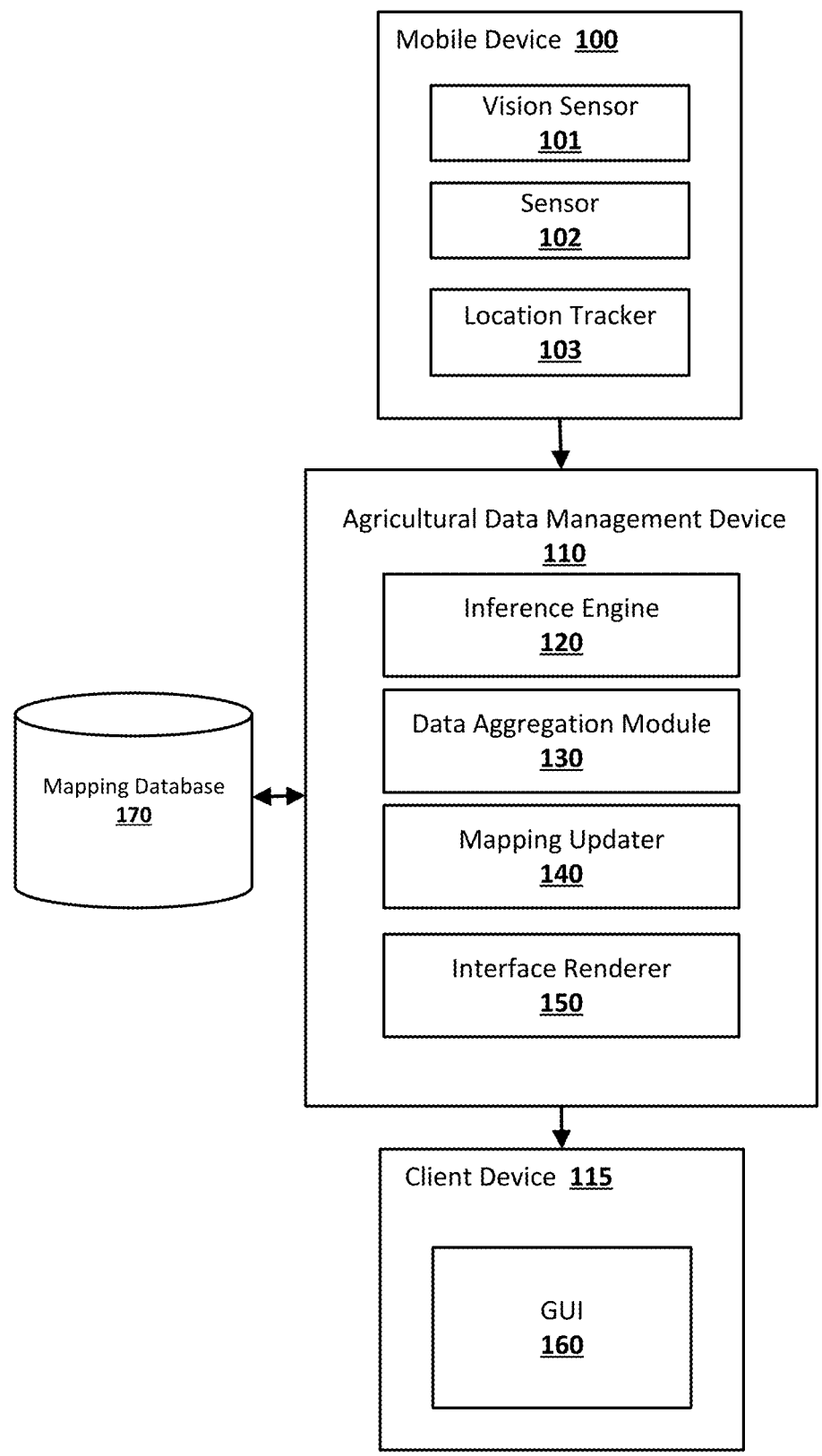
FIG. 1 is an illustration of an example environment in which implementations disclosed herein can be implemented.

Referring to FIG. 1, an illustration of an example environment in which implementations disclosed herein can be implemented is provided. The illustrated environment includes a mobile device 100 that includes a vision sensor 101. The mobile device 100 can be carried through an agricultural field by agricultural equipment, such as a tractor and/or other farm machinery, an agricultural robot, an unmanned aerial vehicle (UAV), agricultural personnel, etc. Mobile device 100 may be separate from but mountable to the vehicle that carries it, or mobile device 100 may be integral with the vehicle.

In various implementations, mobile device 100 includes components that are utilized to process the vision data that is generated by the vision sensor 101. In some implementations, the vision sensor 101 can capture images periodically to reduce the volume of data that is being generated and transmitted. For example, the vision sensor 101 can capture an image every second, every minute, and/or other time period. In some implementations, image data that is captured by the vision sensor 101 can be pre-processed before transmitting the image data (or a portion of the image data) to the agricultural data management device 110. For example, quality of images can be downgraded to reduce the size of transmitted image data. Also, for example, images can be filtered to remove images that are similar to other images and/or that do not include additional image information that is required for determining the state of a location. For example, images may first be analyzed to infer the content of the images and images may only be included in the agricultural data if doing so improves the verifiability of the field condition. Images that are blurry, do not capture the field, are duplicative (e.g., no new information is gained that is not already ascertainable from other images), and/or otherwise are not necessary in determining a state of the field may be discarded before being bundled into the agricultural data. In some implementations, captured images can be associated with a timestamp that indicates a time when an image was captured.

Mobile device 100 further includes one or more other sensors(s) 102 that can capture other data in the agricultural field. For example, in some implementations, mobile device 100 can be equipped with moisture sensors, alkalinity sensors, temperature sensors, and/or other sensors that can periodically measure one or more conditions that are present in the agricultural field. The images and/or sensor data can be stored in one or more databases such that the data can be further analyzed, as described herein. In some implementations, the data can be stored locally on mobile device 100 and provided to one or more other computing devices for further analysis, such as agricultural data management device 110.

The mobile device 100 further includes a location tracking component 103 that can determine a geographic location where the mobile device 100 is located. For example, vision sensor 101 can capture images and location tracking component 103 can determine a location (e.g., position coordinates) where each image is captured, such as via GPS and/or other positioning techniques such as wireless triangulation, inertial measurement units (IMU), etc. Thus, for each image that is captured by the vision sensor 101, a location (and additionally, a time) can be associated with the image that indicates a geographic location where the image was captured (i.e., each image can be geotagged). Also, for example, for each measurement recorded by one or more other sensors 102, a location can be determined by location tracker 103 to indicate where the measurement was taken. Thus, for data that is captured by mobile device 100 while in an agricultural field, each data point can be associated, in a database residing on the mobile device 100 and/or on one or more remote devices, with a location where the data was captured.

Turning to agricultural data management device 110, inference engine 120 can determine one or more inferences from images and/or other sensor data that are received from mobile device 100. For example, in some implementations, mobile device 100 can capture an image that includes the ground conditions for one square meter. The image can include, for example, one or more plants and/or other ground cover as it exists in the agricultural field at a particular location. Inference engine 120 can utilize one or more techniques to determine, for example, crop yield, leaf count, crop condition, and/or other information that can be inferred based on analysis of images, other sensor data (e.g., soil content readings), and/or other data (e.g., weather reports). In some implementations, inference engine 120 can utilize one or more machine learning techniques, in addition to or in lieu of, other image analysis techniques to generate, from an image, one or more numerical values that are indicative of conditions at the geographic location. These machine learning techniques may include, for instance, a convolutional neural network (CNN) that is trained (e.g., using back propagation and/or gradient descent) based on labeled images and/or other data to generate object counts, yield predictions, etc. The resulting data (e.g., inferences) can be stored in a database with a timestamp indicating when the underlying images/sensor data were captured and/or a geographic location where the underlying data was captured.

In some implementations, the data may be processed such that a user can operate a client device 115, including a graphical user interface (GUI) 160 operating on client device 115, to view the data in a mapping application that allows for the user to view the data for a larger geographic region. For example, a user may have interest in a particular field that is one square kilometer. The data that was captured for that field can be displayed to the user such that the user can view the data that was captured at, for example, each square meter of the field in a graphical interface.

Figure 2:
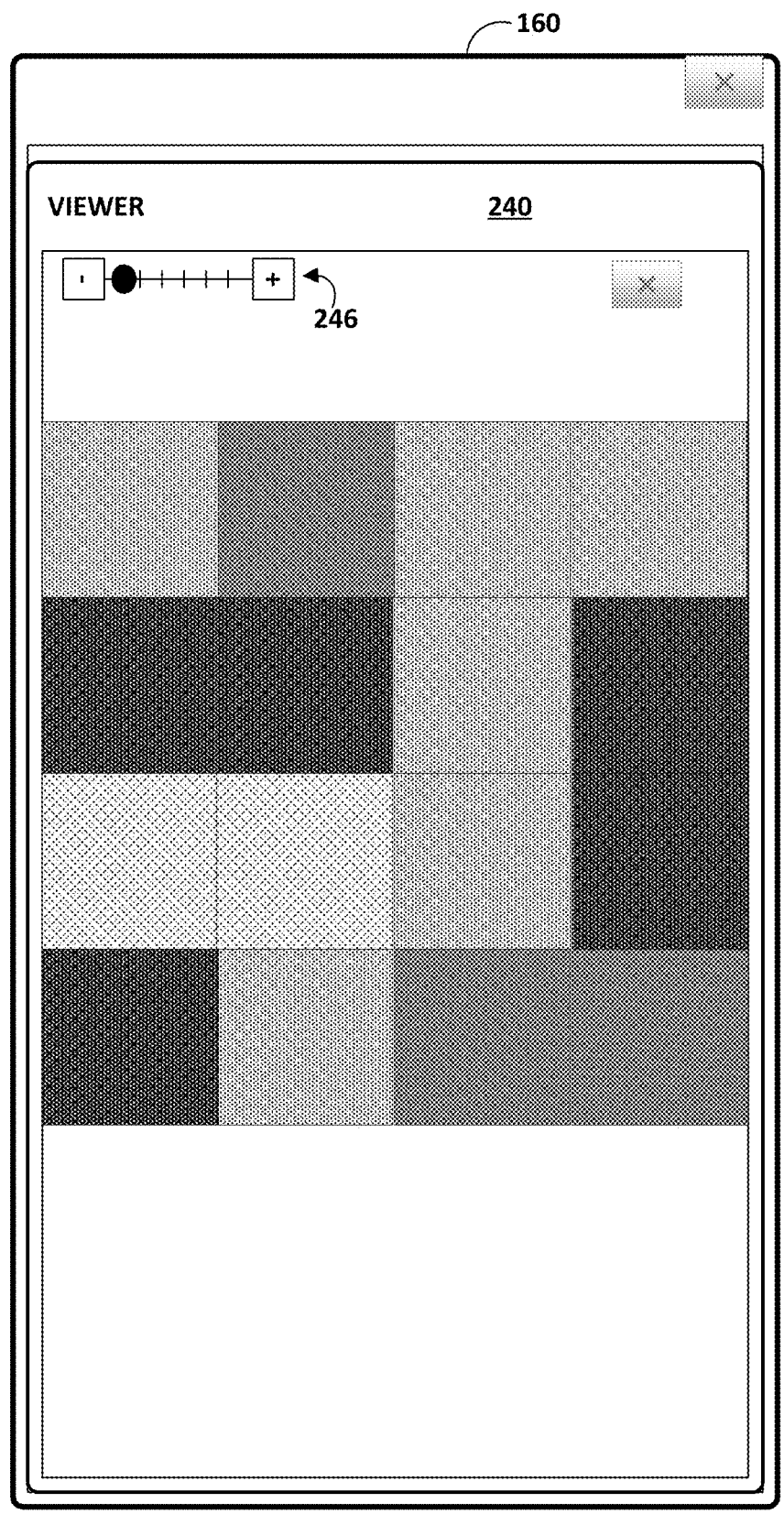
FIG. 2 illustrates an example interface according to implementations disclosed herein.

FIG. 2 depicts one example of a GUI 160 that may be rendered by interface renderer 150, in accordance with various implementations. The GUI 160 includes a viewer 240 and a zoom adjustment element 246. Viewer 240 currently is rendering an overhead view of a geographic region that includes numerous geographic locations, each indicated by a square mapping tile. While the image includes squares, this is not meant to be limiting, and mapping tiles can take any geometric shape, including any polygon shape, ovular, circular, triangular, etc. As shown, each mapping tile that is visible in the viewer 240 is of a different shade, which can indicate a value for the underlying data that is being represented (i.e., a "heat map"). For example, for a particular mapping tile, a darker shade for the tile can indicate a higher value for sensor data that was collected in the agricultural field (e.g., a lighter shade can indicate lower carbon content whereas a darker shade can indicate a higher carbon content). In some implementations, the displayed map can include multiple colors, such that, for example, red can indicate a higher value than blue, with other colors in between indicating a gradient of values.

In some implementations, interface renderer 150 may provide other functionality that enables a user to perform more granular analysis of individual crop fields and/or of individual crops within a crop field. For example, the user may be able to operate zoom adjustment element (slider) 246 in order to zoom viewer 240 in or out. In FIG. 2, for instance, the user has moved the zoom adjustment element (slider) 246 right, as indicated by the arrow, to zoom into a particular crop field that is represented by 16 mapping tiles.

In some implementations, at the highest zoom level, the user may be able to view the images that were captured at each geographic location in the agricultural field. For example, a breeder may wish to analyze individual plants for purposes such as phenotyping. Accordingly, the user may operate zoom slider 246 further to zoom into a close-up view of one or more individual plants. Also, for example, in some implementations where sensors other than cameras captured data at the agricultural location, at the highest granularity, the map can display each tile with the data value(s) from that location. In either instance, the mapping tiles can be shaded and/or colored to indicate underlying data in a heat map display format.

As the user zooms out, instead of representing values that were collected by sensors in the agricultural field, the mapping tiles can each represent an aggregation of one or more mapping tiles from the next level of zoom. For example, for one level from the most zoomed-in level, each of the displayed mapping tiles can represent an aggregation of four underlying tiles. Aggregation can include, for example, any combination of the values of the underlying tile. Thus, a "parent" tile can be an average of two or more "children" tiles from the next higher zoom level, a concatenation of values, an addition of values, and/or other types of aggregation that is meaningful for the type of data point. For example, for mapping tiles that represent crop yield, a parent tile can be an addition of the crop yields from four children tiles. For humidity, the parent tile can represent an average of four children tiles, reflecting an average humidity over a larger area. As the user zooms out even more, additional aggregation can be performed on parent tiles to generate grandparent tiles (e.g., an aggregation of four parent tiles), great-grandparent tiles, etc., until the user has zoomed out to the lowest view of granularity.

FIG. 3 illustrates a grid of mapping tiles, with corresponding parent and grandparent tiles that can be displayed as the user zooms out. Although 16 mapping tiles are illustrated at the highest level of zoom, it should be understood that additional mapping tiles can be displayed around the illustrated grid such that for example, more than four tiles can be displayed at the next lower zoom level and more than one tile can be represented at the next lower zoom level from the parent level. As illustrated, each of the mapping tiles are first represented with a single value, illustrated as a letter between A and P. The parent tiles are illustrated as an aggregation of the values of the child tiles, in this case, an addition of the values. However, as previously mentioned, aggregation can include any number of combinations of the values of the child tiles to generate a value for a parent tile. For example, it is not required that two adjacent parent tiles have mutually exclusive children tiles. Additional parent tiles could be defined that include children of multiple different other parent tiles, for instance, a combination of B, C, F, and G.

Data aggregation module 130 can aggregate the data of mapping tiles to generate views of the various levels of zoom that are required by the mapping interface that is rendered by interface renderer 150 on GUI 160 rendered by client device 115. For example, a mapping interface may be configured with ten levels of zoom. Accordingly, data aggregation module 130 can store the initial data points in mapping database 170 along with a geographic location and a timestamp indicating when the data was captured in the field. Further, data aggregation module 130 can determine the aggregated values of the next ten levels of zoom such that, when a user interacts with the interface 160, the mapping tiles for each level are already calculated, thereby reducing latency while the user is accessing the mapping interface.

In some implementations, new data may become available that can replace previous data in the mapping database 170. This data often arrives in large volumes as there may be myriad large fields being analyzed constantly. For example, in some implementations, a field may be reexamined by one or more vehicles equipped with cameras and/or sensors and generate updated data that represents current conditions in the agricultural field. However, in order for the data to be incorporated into the mapping interface, each level of zoom will require recalculating by data aggregation module 130. For example, if one child mapping tile is updated, then every level of zoom will also require updating because a value on each level was generated based on the underlying child (one fourth of a parent, one sixteenth of a grandparent, etc.). In view of the large volumes of updated data that may be received at any given moment, these updates can require considerable time, and hence, introduce considerable latency to the user.

As new data is available for the mapping interface, mapping updater can identify a corresponding mapping tile in the mapping database 170 and further generate a request to update the parent tiles that are associated with the mapping tile. For example, as data is received, it can be placed in a queue and processed by mapping updater 140 according to timestamps associated with the data (e.g., a first in, first out queue) such that the most recently received (or captured) data is processed last in the queue so that the mapping interface is updated to reflect the most recent data once updating is completed.

Figure 4:
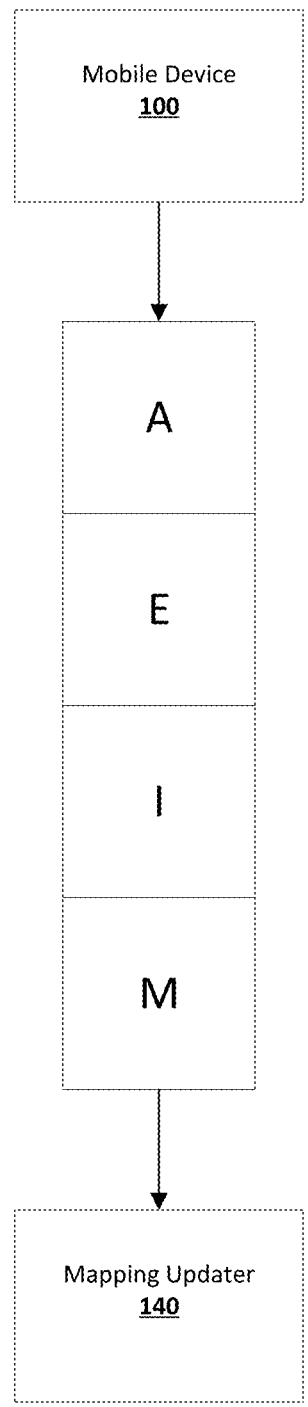
FIG. 4 is an illustration of a queue that includes updated agricultural records according to implementations disclosed herein.

For example, referring to FIG. 4, a queue is illustrated with new agricultural records being placed in the queue at one end and processed at the other end of the queue. The new agricultural records are transmitted by mobile device 100 (or identified in one or more databases after being captured by mobile device 100) and placed in the queue, with record M being the first received and record A being the last received. As the records are received mapping updater 140 can process the records by identifying, based on the geographic location associated with each record, a corresponding map tile record in mapping database 170. Once identified, the mapping tile record can be updated with the new data that is included as part of the record.

Figure 5:
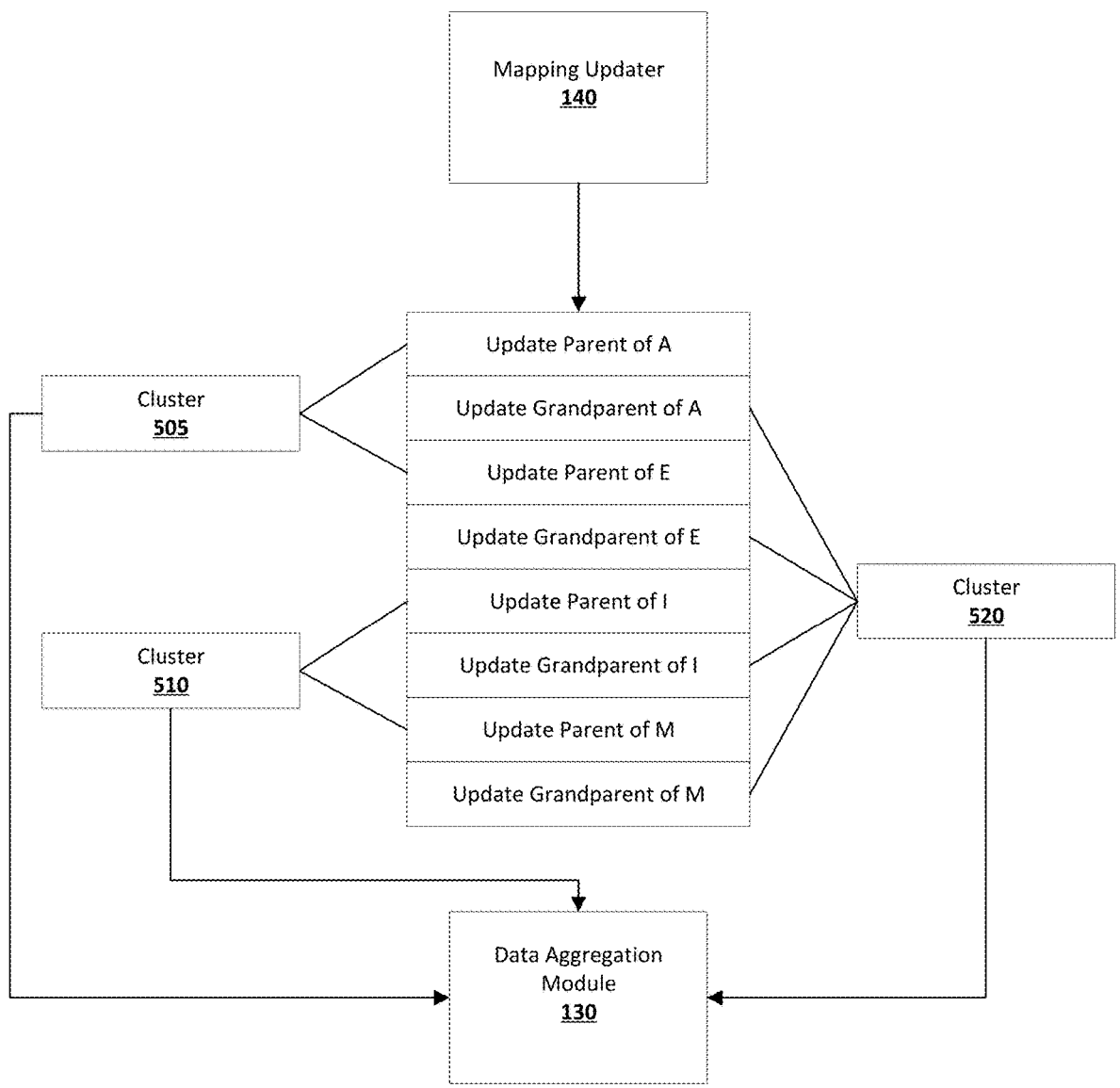
FIG. 5 is an illustration of a queue that includes requests to update mapping tiles according to implementations disclosed herein.

Once a record has been updated in mapping database 170, a request can be queued to update the parents (and grandparents, etc.) of the record. Referring to FIG. 5, a queue is illustrated that includes requests to update tiles on various zoom levels. For purposes of example only, it is assumed that there are two additional zoom levels, a parent zoom level and a grandparent zoom level. However, in practice, there can be any number of levels of mapping tiles that comprise the mapping interface. Thus, by extension, instead of two requests being generated for each updated record (i.e., a parent and a grandparent), a mapping interface with five zoom levels would have five requests for updating tiles (one for each level) for each record that is updated.

Mapping updater 140 can provide requests to a queue that indicates which tiles need to be updated for each updated agricultural record that has been updated. As illustrated, the queue includes requests to update "Parent of A," "Parent of E," "Parent of I," and so forth. Additionally, the queue includes requests to update "Grandparent of A," "Grandparent of E," "Grandparent of I," and so forth. Notably, in some instances, the requests are redundant such that, for example, a request to update the "Parent of A" is the same as a request to update a "Parent of E" (i.e., according to the mapping of FIG. 3, mapping tiles A, B, E, and F share a common parent, labeled "A+B+E+F" in FIG. 3). Further, all of the mapping tiles that have been updated share a common grandparent. Similarly, a request to update the grandparent of A, the grandparent of E, the grandparent of I, and the grandparent of M are the same request.

Once the queue includes multiple requests to update parents (and grandparent, and so on), the requests can be clustered to avoid processing redundant requests. As illustrated in FIG. 5, cluster 505 includes the request to "Update Parent of A" and "Update Parent of E," which can be clustered based on the two mapping records sharing a common parent, as illustrated in FIG. 3. Similarly, cluster 510 can be generated based on common parentage. Still further, cluster 520 can be generated based on the common grandparentage of the mapping records that were updated to generate the request. Accordingly, data aggregation module 130 can process each cluster instead of directly processing the requests. When processing the requests, data aggregation module 130 can process only one of the requests each cluster, thereby reducing computing time and mitigating resources that would otherwise be required to perform the redundant tasks.

Figure 6:
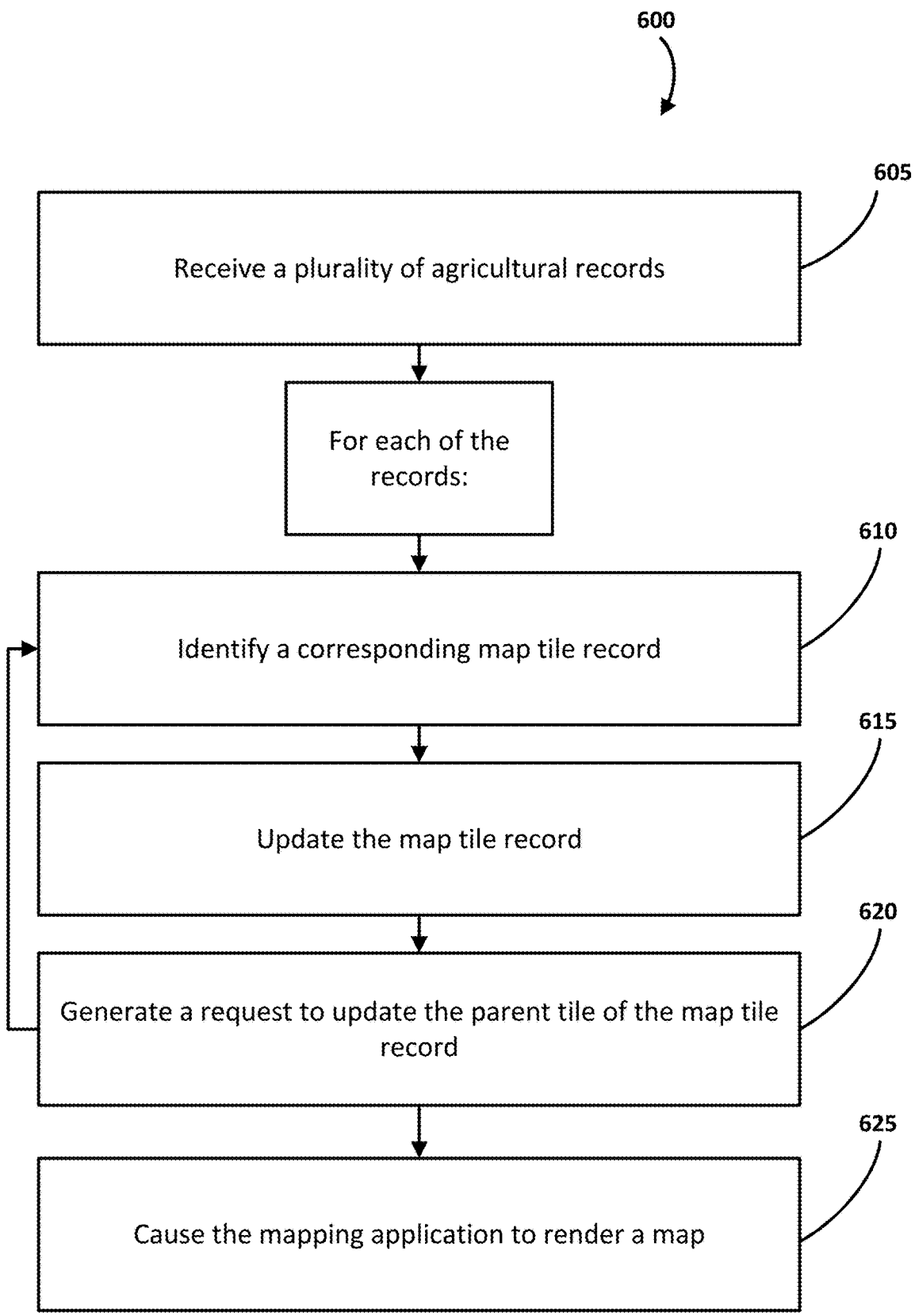
FIG. 6 is a flowchart illustrating an example method according to various implementations disclosed herein.

FIG. 6 depicts a flowchart 600 illustrating an example method of practicing selected aspects of the present disclosure. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 605, a plurality of records is received. Each of the records can include one or more inferences generated by a mobile device that shares one or more characteristics with mobile device 100. In some implementations, the records can include image data, inferences derived from vision data, other sensor data according to the capabilities and configuration of the mobile device 100, and inferences drawn from other data, such as other sensor data or non-sensor data. Further, each of the records can include a location where the data was captured (e.g., geolocation information generated by location tracker 103). Still further, each record can include a timestamp indicating a time when the data was captured at the geographic location.

At step 610, a corresponding map tile record is identified for the agricultural record. The map tile record can be identified based on the location associated with the map tile and the location that is associated with the agricultural record. For example, each map tile can represent a particular area (e.g., one square meter) and one or more components, such as mapping updater 140, can determine, based on the location associated with the record, the particular map tile that includes the location where the data was captured.

At step 615, the map tile record is updated. The data for the map tile can be updated to reflect the data that is included with the agricultural record. In some implementations, a map tile record can be associated with multiple characteristics, each with a value. For example, a map tile record can be associated with a crop yield value, a soil alkalinity value, and a moisture value, each of which can be independently updated according to implementations disclosed herein.

At step 620, a request is generated to update the parent tile of the map tile record. In some implementations, each of the map tile records is associated with a parent, grandparent, etc. in a hierarchical relationship such that a parent map tile record is an aggregation of a plurality of map tile records. For example, the map tile records can be utilized by a mapping application to generate a zoomable interface that allows a user to view an area with varying degrees of granularity. As the user zooms in, the data that was collected at the agricultural location can be viewed. As the user zooms out, aggregations of multiple sensor readings can be displayed to the user to allow the user to view a larger area without significant clutter associated with multiple sensor readings that were collected in close proximity. In some implementations, multiple map tile records are mapped to the same parent, such as on a 4:1 ratio (e.g., a parent is an aggregate of four map tile records), a 9:1 ratio, a 16:1 ratio, etc.

As data is received, steps 610 to 620 can be repeated on each record. Once all records have been updated, at step 625, the mapping application renders a map utilizing the updated map tile records.

Figure 7:
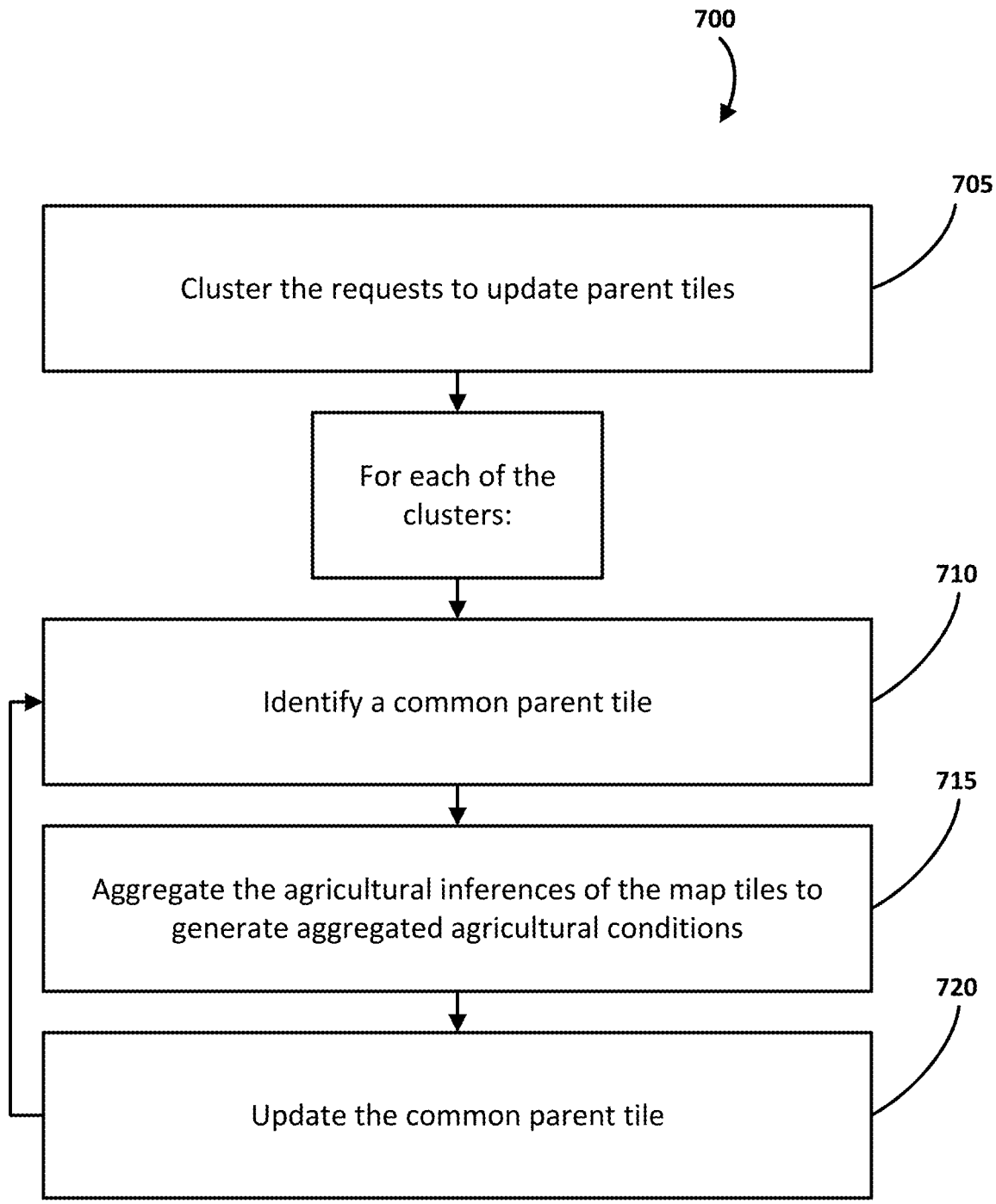
FIG. 7 is another flowchart illustrating an example method according to various implementations disclosed herein.

FIG. 7 depicts a flowchart 700 illustrating an example method of practicing selected aspects of the present disclosure. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 705, the requests to update parent tiles are clustered. The requests can be clustered based on the common parentage of the updated map tiles that generated the requests. For example, referring to FIG. 5, cluster 505 includes the requests to update the parents of A and E, which share a common parent. Similarly, cluster 510 includes the requests to update the parents of I and M, which share a common parent.

At step 710, a common parent tile is identified for the cluster. As previously described, each cluster is generated based on the requests having a common parent tile. The parent tile record can be identified in a database that shares one or more characteristics with mapping database 170.

At step 715, the agricultural inferences of the map tile records are aggregated to generate updated aggregated agricultural conditions for the parent. Aggregation can include, for example, averaging of values of the child tiles, addition of the values of the child tiles, and/or any other aggregation whereby the values of the child tile contribute to the generation of the parent tile value(s). In some implementations, tiles can have multiple values for multiple sensor readings that were collected at the agricultural location. Each can be independently aggregated and, for a given parent tile, two different sensor values can be aggregated in different manners. For example, a map tile can have a crop yield value and a moisture content value. The parent can aggregate crop yield by adding the crop yields of the children and the moisture content value of the parent can be an average of the moisture content of the child tiles. At step 720, the common parent tile is updated to reflect the aggregated agricultural conditions. Steps 710 to 720 can be repeated for each cluster.

The steps of method 700 can be extended to additional layers beyond a parent layer. As previously disclosed, a similar method can be utilized to update grandparent map tiles (e.g., tile two layers above the map tiles) utilizing a similar method. For example, referring to FIG. 5, cluster 520 includes four requests to update grandparents of A, E, I, and M, all of which share a common grandparent.

Figure 8:
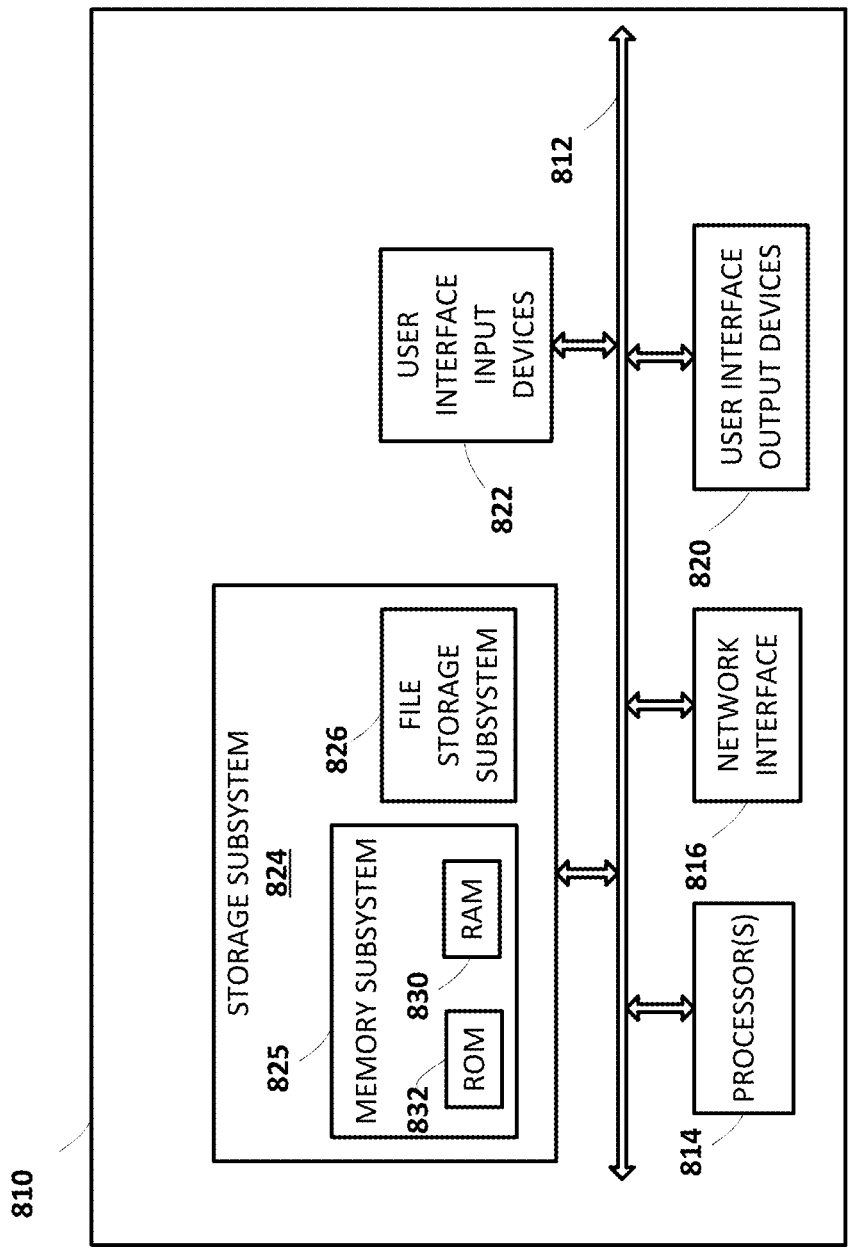
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIGS. 6-7, and/or to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In some implementations, a method is disclosed and includes the steps of: receiving a plurality of agricultural records, wherein each agricultural record includes a corresponding geographic location within an agricultural field and one or more agricultural inferences generated from sensor data that captures agricultural conditions at the corresponding geographic location. For each of the records, the method further includes: identifying, based on the corresponding geographic location, a corresponding map tile record of a plurality of map tile records, wherein the corresponding map tile record represents the geographic location in a mapping application, wherein each map tile includes a parent map tile record, wherein the parent map tile record includes aggregated agricultural inferences aggregated from a plurality of adjacent map tile records; updating the map tile record based on the one or more agricultural inferences; and generating a request to update the aggregated agricultural inferences of the parent map tile record based on the one or more agricultural inferences of the updated map tile record. Further, the method includes causing the mapping application to render a map that depicts the plurality of map tile records visually annotated in accordance with corresponding agricultural inferences.

These and other implementations of the technology disclosed herein can include one or more of the following features.

In some implementations, the method further includes clustering multiple requests to update parent tiles based on map tile records that share a common parent map tile. For each of the clusters, the method further includes: identifying the common parent map tile record; aggregating the agricultural inferences of the map tiles of the cluster to generate the aggregated agricultural conditions; and updating the common parent map tile record based on the aggregated agricultural conditions.

In some implementations, each of the plurality of agricultural records was generated from one or more images captured by one or more imaging devices deployed at the corresponding geographic location.

In some implementations, the one or more agricultural inferences includes crop yield at the geographic location.

In some implementations, each parent map tile record has a grandparent map tile record, and wherein at least two of the parent map tile records share a common grandparent map tile record. In some of those implementations, the method further includes, for each updated parent map tile record, generating a request to update the corresponding grandparent map tile record; and clustering the requests to update the grandparent map tile records based parent map tile records that share a common grandparent map tile records. For each of the clusters, the method further includes: identifying the common grandparent map tile record, aggregating the aggregated agricultural conditions of the parent map tile records, and updating the common grandparent map tile based on the aggregation.

In some implementations, the one or more agricultural inferences includes leaf count at the geographic location.

In some implementations, causing the mapping application to render a map that depicts the plurality of map tile records includes rendering the plurality of map tile records as a heat map with respective colors that correspond to respective agricultural inferences.

In addition, some implementations may include a system including one or more assistant devices, each with one or more processors and memory operably coupled with the one or more processors, where the memory(ies) of the one or more assistant devices store instructions that, in response to execution of the instructions by the one or more processors of the one or more assistant devices, cause the one or more processors to perform any of the methods described herein. Some implementations also include at least one non-transitory computer-readable medium including instructions that, in response to execution of the instructions by one or more processors, cause the one or more processors to perform any of the methods described herein.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method, implemented by one or more processors, comprising:
   receiving an agricultural record, wherein the agricultural record includes a geographic location within an agricultural field and one or more agricultural inferences generated from sensor data that captures agricultural conditions at the geographic location;
   identifying, based on the geographic location, a map tile record, wherein the map tile record corresponds to the geographic location, wherein the map tile record includes a first parent map tile record and a grandparent map tile record, wherein the first parent map tile record includes aggregated agricultural inferences aggregated from a plurality of adjacent map tile records and the grandparent map tile record includes aggregated agricultural inferences aggregated based on the first parent map tile record and a second parent map tile record, wherein the first parent map tile record and the second parent map tile record relate to a common map tile record;
   updating the map tile record based on the one or more agricultural inferences;
   updating the aggregated agricultural inferences of the first parent map tile record based on the one or more agricultural inferences of the updated map tile record;
   generating a request to update the grandparent map tile record;
   updating the grandparent map tile record based on a cluster of requests to update the grandparent map tile record, the cluster of requests clustered based on the first parent map tile record and the second parent map tile record, and the grandparent map tile record is updated based on the aggregated agricultural inferences of the first parent map tile record and the second parent map tile record; and
   causing a mapping application to render a map that depicts the map tile record visually annotated in accordance with corresponding agricultural inferences.

2. The method of claim 1, further including:
   clustering multiple requests to update parent tiles based on map tile records that share a common parent map tile record; and for each of the clusters:
  identifying the common parent map tile record;
  aggregating the agricultural inferences of map tiles of the cluster to generate aggregated agricultural conditions; and
  updating the common parent map tile record based on the aggregated agricultural conditions.

3. The method of claim 1, wherein the agricultural record was generated from one or more images captured by one or more imaging devices deployed at the geographic location.

4. The method of claim 1, wherein the one or more agricultural inferences includes crop yield at the geographic location.

5. The method of claim 1, further including a third map tile record that has a third parent map tile record that relates to the grandparent map tile record.

6. The method of claim 5, further including:
  clustering the requests to update the grandparent map tile record, wherein the requests include the first parent map tile record, the second parent map tile record, and the third parent map tile record; and
  for each of the clusters:
    identifying a common grandparent map tile record;
    aggregating aggregated agricultural conditions of the parent map tile records included in the clustered requests to update the grandparent map tile record; and
    updating the common grandparent map tile record based on the aggregation.

7. The method of claim 1, wherein the one or more agricultural inferences includes leaf count at the geographic location.

8. The method of claim 1, wherein causing the mapping application to render a map that depicts the map tile record includes rendering a plurality of map tile records as a heat map with respective colors that correspond to respective agricultural inferences.

9. A system comprising one or more processors and memory storing instructions that, in response to execution of the instructions by the one or more processors, cause the one or more processors to:
  receive an agricultural record, wherein the agricultural record includes a geographic location within an agricultural field and one or more agricultural inferences generated from sensor data that captures agricultural conditions at the geographic location;
  identify, based on the geographic location, a map tile record, wherein the map tile record corresponds to the geographic location, wherein the map tile record includes a first parent map tile record and a grandparent map tile record, wherein the first parent map tile record includes aggregated agricultural inferences aggregated from a plurality of adjacent map tile records and the grandparent map tile record includes aggregated agricultural inferences aggregated based on the first parent map tile record and a second parent map tile record, wherein the first parent map tile record and the second parent map tile record relate to a common map tile record;
  update the map tile record based on the one or more agricultural inferences;
  update the aggregated agricultural inferences of the first parent map tile record based on the one or more agricultural inferences of the updated map tile record;
  generate a request to update the grandparent map tile record;
  update the grandparent map tile record based on a cluster of requests to update the grandparent map tile record, the cluster of requests clustered based on the first parent map tile record and the second parent map tile record, and the grandparent map tile record is updated based on the aggregated agricultural inferences of the first parent map tile record and the second parent map tile record; and
  cause a mapping application to render a map that depicts the map tile record visually annotated in accordance with corresponding agricultural inferences.

10. The system of claim 9, wherein the instructions further include instructions to:
  cluster multiple requests to update parent tiles based on map tile records that share a common parent map tile record; and
  for each of the clusters:
    identify the common parent map tile record;
    aggregate the agricultural inferences of map tiles of the cluster to generate aggregated agricultural conditions; and
    update the common parent map tile record based on the aggregated agricultural conditions.

11. The system of claim 9, wherein the agricultural record was generated from one or more images captured by one or more imaging devices deployed at the geographic location.

12. The system of claim 9, wherein the one or more agricultural inferences includes crop yield at the geographic location.

13. The system of claim 9, further including a third map tile record that has a third parent map tile record that relates to the grandparent map tile record.

14. The system of claim 13, wherein the instructions further include instructions to:
  cluster the requests to update the grandparent map tile record, wherein the requests include the first parent map tile record, the second parent map tile record, and the third parent map tile record; and
  for each of the clusters:
    identify a common grandparent map tile record;
    aggregate aggregated agricultural conditions of the parent map tile records included in the clustered requests to update the grandparent map tile record; and
    update the common grandparent map tile record based on the aggregation.

15. The system of claim 9, wherein the one or more agricultural inferences includes leaf count at the geographic location.

16. The system of claim 9, wherein causing the mapping application to render a map that depicts the map tile record includes rendering a plurality of map tile records as a heat map with respective colors that correspond to respective agricultural inferences.

17. A non-transitory computer-readable medium for performing sparse depth estimation, the non-transitory computer-readable medium comprising instructions that, in response to execution of the instructions by a processor, cause the processor to:
  receive an agricultural record, wherein the agricultural record includes a geographic location within an agricultural field and one or more agricultural inferences generated from sensor data that captures agricultural conditions at the geographic location;
  identify, based on the geographic location, a map tile record, wherein the map tile record corresponds to the geographic location, wherein the map tile record includes a first parent map tile record and a grandparent map tile record, wherein the first parent map tile record includes aggregated agricultural inferences aggregated from a plurality of adjacent map tile records and the grandparent map tile record includes aggregated agricultural inferences aggregated based on the first parent map tile record and a second parent map tile record, wherein the first parent map tile record and the second parent map tile record relate to a common map tile record;

update the map tile record based on the one or more agricultural inferences;

update the aggregated agricultural inferences of the first parent map tile record based on the one or more agricultural inferences of the updated map tile record;

generate a request to update the grandparent map tile record;

update the grandparent map tile record based on a cluster of requests to update the grandparent map tile record, the cluster of requests clustered based on the first parent map tile record and the second parent map tile record, and the grandparent map tile record is updated based on the aggregated agricultural inferences of the first parent map tile record and the second parent map tile record; and cause a mapping application to render a map that depicts the map tile record visually annotated in accordance with corresponding agricultural inferences.

18. The non-transitory computer-readable medium of claim 17, further including instructions to:

cluster multiple requests to update parent tiles based on map tile records that share a common parent map tile record; and for each of the clusters:
identify the common parent map tile record;
aggregate the agricultural inferences of map tiles of the cluster to generate aggregated agricultural conditions; and
update the common parent map tile record based on the aggregated agricultural conditions.

19. The non-transitory computer-readable medium of claim 17, further including a third map tile record that has a third parent map tile record that relates to the grandparent map tile record.

20. The non-transitory computer-readable medium of claim 19, further including instructions to:

cluster the requests to update the grandparent map tile record, wherein the requests include the first parent map tile record, the second parent map tile record, and the third parent map tile record; and for each of the clusters:
identify a common grandparent map tile record;
aggregate aggregated agricultural conditions of the parent map tile records included in the clustered requests to update the grandparent map tile record; and
update the common grandparent map tile record based on the aggregation.

* * * * *